Dec. 29, 1959 W. E. GLENN, JR 2,919,302

COLOR INFORMATION PRESENTING SYSTEM

Filed Oct. 7, 1957

Inventor:
William E. Glenn, Jr., by Richard R. Brainard
His Attorney.

United States Patent Office 2,919,302
Patented Dec. 29, 1959

2,919,302

COLOR INFORMATION PRESENTING SYSTEM

William E. Glenn, Jr., Scotia, N.Y., assignor to General Electric Company, a corporation of New York Application October 7, 1957, Serial No. 688,597
12 Claims. (Cl. 178—5.4)

Figures 1, 2:
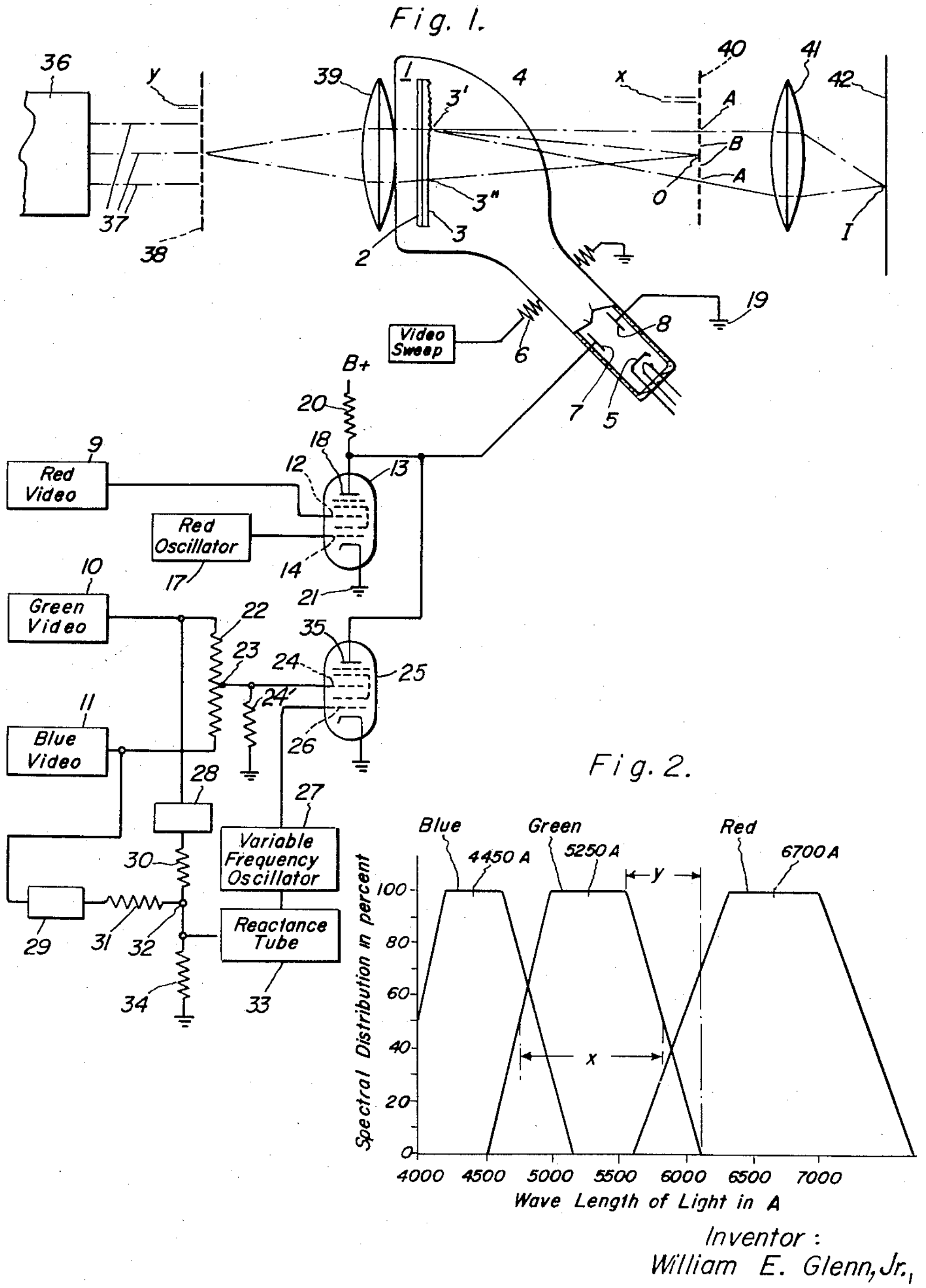

The present invention relates to improved systems for presenting color information and more particularly to an improved system for the projection of color images at a location remote from the display or scene to be reproduced.

The projection of color images, for example color television pictures, has been accomplished by systems employing various combinations of electric and optical equipment. In some of these, colored pictures are produced by the optical mixing of color components produced by color filters. These systems involve extremely difficult mechanical problems and the quality of the picture has not been as good as desired.

A known system for projecting black and white television images on a screen involves the use of a light modulating medium which is scanned by an electron beam to vary the light transmitting characteristics thereof in point-by-point correspondence with the scene to be reproduced so that the intensity of light projected through the modulating medium by means of a suitable optical system varies in intensity point-by-point with the desired image. One attempt to use this type of system for the projection of color pictures has involved, for example, the duplication of the system for each color component to be used and the combination of the outputs of these systems through suitable color filters to produce the color picture. Such systems are obviously complicated and involve mechanical and optical problems which render the attainment of acceptable picture quality very difficult.

In occordance with the invention described and claimed in my copending application, Serial No. 433,447, filed June 1, 1954, now Patent No. 2,813,146, granted November 12, 1957, entitled "Colored Light System" and assigned to the assignee of the present invention, color images are produced by a system utilizing a single modulating medium on which are established simultaneously a plurality of diffraction patterns. Each pattern has one parameter corresponding to one color component and a second parameter varying in accordance with the intensity of the corresponding component so that light projected through the modulating medium and through a suitable light masking system conveys both the intensity variation and color selection to the screen in point-by-point correspondence with the scene to be reproduced. The system may be applied to different types of color systems; that is, for example, systems using either two or three color components to make up the total color content.

In accordance with an important aspect of the present invention a plurality of color components, at least one of which is a component of variable color, are combined to produce an improved picture and eliminate some difficulties that are experienced as a result of the interaction of the three components of an ordinary three color system when applied to the simultaneous diffraction patterns employed in the system described and claimed in my aforementioned copending application.

Accordingly, it is an important object of the present invention to provide an improved color projection system particularly suited for television projection and utilizing simultaneously formed diffraction patterns corresponding to a plurality of color components, at least one of which is a variable color component, on a light modulating medium for determining point-by-point the color content intensity of illumination of the image.

It is a further object of the invention to provide a color information presenting system having improved quality with particular respect to the elimination of unwanted interaction between the individual color components.

It is a further object of my invention to provide an improved color information presenting system utilizing signals corresponding to fixed and variable color components to establish corresponding diffraction gratings having both intensity and color component information.

Further objects and advantages of the invention will become apparent as a following description proceeds, reference being had to the accompanying drawing and its scope will be pointed out in the appended claims.

In the drawing Figure 1 illustrates schematically a color television projection system embodying my invention in which simultaneous diffraction patterns are formed in response to a plurality of electrical color signals and at least one of which corresponds to a variable color component and Figure 2 is a spectral distribution diagram for a three primary color system.

In Figure 1 of the drawing I have shown my invention embodied in a color television projection system for projecting color pictures which includes a light modulating medium or structure 1 which may be deformed point-by-point as it is scanned by an electron beam to provide diffraction gratings thereon containing color intelligence with respect to the color components and to the intensities of those components. The medium may be composed of a conductive gelatinous coating approximately 3 mils thick overlaying a transparent conductive member, or, in the preferred form illustrated schematically may be of the same general type as that employed in what is known as the Eidiphor system for projecting black and white pictures. Such a modulating medium may include a transparent support 2 of suitable material, such as glass, and to which is applied a thin film of oil designated at 3 and having the desired degree of conductivity. Also, the temperature of the oil film is cooled by suitable means, not shown, as it is in presently known Eidiphor type systems. As illustrated schematically in the drawing the structure 1 is incorporated in a cathode ray or electron beam tube designated generally by the numeral 4 and including, in addition to the light modulating structure 1, a source of electrons in the form of a cathode 5, an electromagnetic video sweep coil 6 and an additional pair of electrostatic deflection plates 7 and which in the particular embodiment illustrated are utilized to velocity modulate the beam as it scans the light modulating medium, in a vertical direction as illustrated in the drawing. It will be understood that the schematic representation of Figure 1 may be considered as essentially a top view with respect to the picture position of an ordinary television screen; that is, the movement of the beam in a vertical direction as viewed on the paper corresponds to the horizontal sweep of an ordinary television picture tube. The coil 6 is energized by a conventional video sweep circuit illustrated diagrammatically at 9 to produce an interlace scan, as will be well understood by those skilled in the art.

In accordance with an important aspect of the present invention the layer 3 is deformed to present color information in point-by-point correspondence with a display by controlling the electron beam in accordance with two electrical signals, one signal of fixed frequency corresponding to one color component and varying in amplitude in accordance with the intensity of that color component and a second signal of a frequency varying in accordance with the ratio of the intensities of two other color components and an amplitude varying in accordance with the sum of the intensities of those two color components. In the particular embodiment illustrated these two electrical signals are applied to the deflection plates 7 and 8 to modify the horizontal sweep of the electron beam in accordance therewith. In the drawing indicated schematically at 9, 10 and 11, respectively, are sources of red, green and blue video signals which vary in amplitude with these color components of a picture or display to be reproduced. Since these signals may be produced from a received color television picture signal in accordance with apparatus well known in the art further detailed illustration or discussion of them is omitted in the interest of simplifying the disclosure. As will be understood, these signals vary in point-by-point correspondence with the scene or display to be reproduced and that the video sweep will be synchronized with these signals. The red video signal is applied to one control member or grid 12 of a mixer or converter valve 13. Valve 13 is provided with a second control member or grid 14 energized from a fixed frequency oscillator illustrated schematically at 17 and having a frequency corresponding to the center frequency for the red component or about 14 megacycles for the system illustrated in Figure 1. The anode 18 of the mixer valve 13 is connected to one of the deflection plates 7, the other of which is connected to ground, as indicated at 19. Likewise, the anode 18 is connected through a resistor 20 to a source of B plus voltage. The cathode of discharge device 12 is connected to ground as shown at 21. For a system using three fixed color components the green and blue video signals would be impressed respectively on the control members of additional discharge devices corresponding to the device 13 for the red video signal. In accordance with the present invention however the green and blue video signals are combined to form a variable color component in accordance with the ratio of the intensities of the green and blue signals and having an intensity varying in accordance with the sum of the intensities of the green and blue video signals. As illustrated in the drawing the green and blue video signals are added together by means of a voltage adding resistor 22 having a center tap 23 connected to a control member or grid 24 of an electric discharge device 25. The grid 24 is also connected to ground through resistor 24'. This control electrode supplies the color intensity information in accordance with the sum of the voltages of the green and blue video signals. A second control member or grid 26 of the discharge device 25 is energized by the output of a variable frequency oscillator 27 in accordance with a function equal to a constant plus the log of the intensity of the blue signal divided by the intensity of the green signal. In other words, the frequency varies in accordance with the constant plus the logarithm of the blue signal minus the logarithm of the green signal. As shown in the drawing the green video signal is supplied to an amplifier illustrated diagrammatically at 28 and the blue video signal supplied to an amplifier illustrated at 29. Both of these amplifiers have a characteristic in accordance with which the output current is essentially the logarithm of the input voltage. Such amplifiers are well known in the art and may involve the use of an amplifier discharge device having such a characteristic between the grid voltage and plate current, for example a standard receiving tube of type designated commercially as the 6BJ6. The outputs of amplifiers 28 and 29 are subtracted by means of resistors 30 and 31 connected to the outputs of these amplifiers and together to provide the difference of the logarithms of the intensities of the blue and green signals at the point 32. This voltage is impressed on the input of a reactance tube circuit 33 utilized to control the frequency of the variable frequency oscillator 27. The reactance tube circuit may be of a type well known in the art and constitutes a static means for varying the tuning of the variable frequency oscillator 27 in accordance with the input signal to the reactance tube circuit. The point 32 is also connected to ground through a resistor 34. The anode 35 of electric discharge device 24 is connected to the anode 18 of discharge device 13 and to the deflection plate 7 to simultaneously impress on the deflection plates 7 and 8 a voltage corresponding to the outputs of the discharge devices 13 and 25. Two superimposed diffraction patterns are, in this way, established on the deformable light modulating medium 3 in accordance with two color intelligence signals which modify the scanning velocity of the electron beam. The first signal has a frequency corresponding to red and an intensity corresponding to intensity of the red component and thus forms a phase diffraction pattern having a corresponding fixed wavelength and a variable amplitude which varies in point-by-point correspondence with the intensity of the red component of the image to be presented. The second signal produces on the deformable light modulating medium 3 a diffraction pattern having a wavelength $w$ which varies in accordance with the equation.

$$1/w = K + \log \frac{\text{blue intensity}}{\text{green intensity}}$$

where K is a constant equal to a frequency corresponding to a wavelength between blue and green or about 4930 Angstroms. For a particular system of the type shown in Figure 1 the frequency is about 19 megacycles. Since $$\log \frac{\text{blue intensity}}{\text{green intensity}}$$

is equal to zero when the blue and green signals are of equal magnitude so that $f = K$ under this condition. The amplitude of this diffraction pattern varies in accordance with the sum of the green and blue intensities.

In the above description the electrical color signals are combined and applied to the deflection plates 7 and 8 to modify the velocity of the sweep and thus modify the deformations of the medium 3 in accordance with these signals. It will be apparent that the deformations may likewise be produced by applying the color signals to the control grid of a triode type of gun if desired.

In the foregoing description the amplifiers 28 and 29 are described as having a logarithmic relation between input and output. Since the received video signals may already have a logarithmic relation between amplitude and the intensity of the corresponding color component, these non-linear amplifiers may not be necessary. It will be understood, however, that compensation or correction for non-linearity in the system may be made, if desired, by the use of amplifiers or other circiut componets having a compensating non-linearity.

The light modulating medium retains the deformation sufficiently to provide for the projection of scenes at the television frame rate, or one thirtieth of a second and these deformations correspond point-by-point with the color information supplied to the medium by means of the red signal of fixed frequency and the blue-green signal of variable frequency.

As described in detail in my aforementioned copending application a suitable optical system for projecting light through the modulating medium 3 and transmitting first order diffraction patterns and blocking zero order diffraction patterns may be utilized with these diffraction gratings for color selection to reproduce an image corresponding point-by-point with the video color information which, in turn, corresponds with the scene or image to be reproduced. Such a system is illustrated schematically in Figure 1 of the drawing in which a source of light is designated generally by the numeral 36. This light passes through the openings of a bar and slit system 38 as generally parallel rays of light, through a converging lens 39, through the light modulating medium 3, at two points 3′ and 3″ and selectively through a bar and slit system 40 cooperating with the bar and slit system 38 to pass the first order diffraction patterns and mask or block zero order diffraction patterns. Light passing through the slits of the system 40 are converged by lens 41 to reproduce the image of point 3′ of the medium 3 on the screen 42.

As illustrated in the drawing the portion of the modulating medium 3′ to which the upper ray of light passes contains ripples representing the diffraction patterns formed by the color signals. Accordingly, this ray of light is diffracted and passes through the slits designated A in the bar slit system 40. These slits are the second slits outwardly from the center bar and these rays are converged by the lens 41 and illuminate the screen 42 at the point I forming a color image corresponding to the point 3′ on the modulating medium. This point will correspond in color and intensity to the combined effect of the diffraction patterns at the point 3′ which, in turn, represents a corresponding point of the image to be reproduced in accordance with the electrical color intelligence signals. Also, as illustrated, the undeformed point 3″ of modulating medium 3 does not diffract the light—this light impinges on the center bar at point O corresponding to light passing the central slit of the bar and slit system. 38. When considering the entire modulating medium 3 as having superimposed diffraction patterns corresponding point-by-point to a color scene to be reproduced and the entire modulating medium illuminated by light passed by the bar and slit system 38 and selectively by the bar and slit system 40 it can be seen that the scene is reproduced on the screen 42.

When a three primary color system is utilized in a system of the general type described in the foregoing and each color signal is employed to form a diffraction grating on the light modulating medium difficulties are experienced with beat frequencies particularly between the green and blue signals which are within the resolution of the optical system and tend to deteriorate the quality of the resolution. By using a variable color, that is, a color signal having a variable frequency, as described in the foregoing application, beat frequencies of the magnitude described in connection with the three-color system are eliminated. The beat frequencies between the red signal, for example, and the variable frequency signal in accordance with the present invention, are such as to diffract light through slit B or the first slit out from the bar blocking the zero order. Since this is a much smaller angle than that to which the first order of the color components are diffracted the light produced by this beat frequency would tend to produce white light for high intensities of the variable and red signals and when the variable color is at 4930 A. This is the condition when the scene is white. This is particularly desirable since the addition of white under these conditions produces more light transmission. The color of the light diffracted by the beats when the variable color is not 4930 A., tends to enhance the color being produced.

It is believed that the design of the optical system, including the bar and slit system 38 and 40, will be readily understood by those skilled in the art, particularly in view of the disclosure of my above-mentioned copending application. It is believed desirable to point out that the design of the bar and slit system involves a compromise between such factors as light intensity, resolution and color purity. From the standpoint of light available at the screen it is desirable to make the slits in both systems 38 and 40 as wide as possible. Also, because of diffraction at the edges of the slits it is desirable to make the slits in set 40 as wide as possible. The larger these slits are the better the resolution will be. On the contrary, the color purity or, in other words, the color selecting properties of the light masking system will deteriorate as these slits increase in width. In a typical system in which the bar and slits systems are both in the order of 6″ from the modulating medium the center-to-center spacing of the bars in each system is in the order of 50 mils, the slits in the system 38 are ⅙ of the center-to-center spacing or approximately 8.3 mils and the slits in the bar and slit system 40 are twice that width. It will be understood that the dimensions and spacings for a given resolution and color purity will depend upon the geometry of the entire system including the dimensions of the modulating medium the frequency at which it is scanned and the like.

In Figure 2 I have shown a typical three color primary system of blue, green and red having center wavelengths respectively of 4450 A., 5250 A., 6700 A. This curve shows the spectral distribution in percent plotted against wavelength in angstrom units. The width of the color components at the 50% points is determined by the width of the slots X in the output grating 40 and the width of the slope is determined by the width of the slots Y in the input grating 38 for a given geometry of the remainder of the system. As used in this specification and the appended claims color component is used in the sense illustrated in Figure 2 to refer to colored light of a limited band of wavelengths within the visible spectrum which when combined with one or more similar color components each having a limited band of wavelengths within the visible spectrum and displaced in wavelength from the first band, produces color content corresponding to that of the scene to be reproduced.

It will be apparent to those skilled in the art that the present invention is applicable generally to systems for recording color information by the formation of simultaneous diffraction patterns whether or not the color information is projected simultaneously or recorded for subsequent projection. While in the present system one fixed and one variable color has been utilized, it is apparent that two variable colors could be used, for example, by combining the remaining color component in the particular illustration described red with one of the other components, such as green, although the system described has particular advantage with respect to the addition of white by the beat frequencies between the fixed and variable color components.

In the foregoing description the light has been described as a source of line light and this is advantageous from the standpoint of the amount of light that may be provided. It is not necessary that rays of light illuminating the medium be parallel but they should approach parallelism sufficiently to minimize the detrimental effect of diffused lighting on color selection. In other words, the sine and tangent of the angle of incidence should be nearly equal. Light masking systems other than bars and slits may be used. For example, light transmitting portions in the form of small openings in the input mask aligned with opaque portions in the output mask separated by similar small openings may be employed if desired.

While I have illustrated and described particular embodiments of my invention it will be apparent to those skilled in the art that many changes and modifications may be made without departing from my invention in its broader aspects and I aim, therefore, in the appended claims to cover all such changes and modifications as fall within the true spirit and scope of my invention.

What I claim as new and desire to secure by Letters Patent of the United States is:

1. A system for presenting color information corresponding to a display comprising a unitary light modulating medium, and means simultaneously subjecting said light modulating medium to a plurality of color intelligence signals, one of said signals having a fixed parameter corresponding to one color component of said display, another of said signals having a variable parameter varying in accordance with the relative intensity of a plurality of other color components of said display, each of said signals having a second parameter varying in accordance with the intensity of the corresponding color component to establish simultaneously on said medium a plurality of diffraction patterns with each pattern having one parameter corresponding to one of said color intelligence signals and a second parameter varying point-by-point with the intensities of said signals to produce diffraction patterns presenting point-by-point the color and intensity of the image to be presented.

2. A system for presenting color image corresponding to a display comprising a unitary light modulating medium, and means simultaneously subjecting said light modulating medium to a plurality of color intelligence signals, one of said signals having a fixed parameter corresponding to one color component of said display, another of said signals having a variable parameter varying in accordance with the relative intensity of a plurality of other color components of said display, each of said signals having a second parameter varying in accordance with the intensity of the corresponding color component to establish simultaneously on said medium a plurality of phase diffraction patterns with one diffraction pattern having a wavelength corresponding to said one color component and another phase diffraction pattern having a wavelength varying in accordance with the relative intensity of said plurality of other color components, each of said phase diffraction patterns having an amplitude varying point-by-point with the intensities of corresponding ones of said color intelligence signals to produce diffraction patterns representing point-by-point the color and intensity of the image to be presented.

3. A system for producing a color image corresponding to a display comprising a light modulating medium, means simultaneously subjecting said light modulating medium to a plurality of color intelligence signals, one of said signals having a fixed parameter corresponding to one color component of said display, another of said signals having a variable parameter varying in accordance with the relative intensity of a plurality of other color components of said display, each of said signals having a second parameter varying in accordance with the intensity of the corresponding color component to establish simultaneously on said medium a plurality of diffraction patterns with each pattern having one parameter corresponding to a different one of said color intelligence signals and a second parameter varying point-by-point with the intensity of said corresponding color intelligence signals, and a source of light for illuminating said medium with light rays and means including the light mask for blocking zero order light diffraction patterns emanating from said medium and passing first order light diffraction patterns emanating from said medium to produce an image having point-by-point color and intensity correspondence with the display.

4. A system for producing a color image corresponding to a display comprising a light modulating medium, means simultaneously subjecting said light modulating medium to a plurality of color intelligence signals, one of said signals having a fixed parameter corresponding to one color component of said display, another of said signals having a variable parameter varying in accordance with the relative intensity of a plurality of other color components of said display, each of said signals having a second parameter varying in accordance with the intensity of the corresponding color component to establish simultaneously on said medium a plurality of phase diffraction patterns with one of said phase diffraction patterns having a wavelength corresponding to said one of said color components and another phase diffraction pattern having a wavelength varying in accordance with the relative magnitude of said plurality of other color components, each of said phase diffraction patterns having an amplitude varying point-by-point with the intensities of corresponding ones of said color intelligence signals, and a source of light for illuminating said medium with light rays and means including a light mask for blocking zero order light diffraction patterns emanating from said medium and passing first order light diffraction patterns emanating from said medium to produce an image having point-by-point color and intensity correspondence with the display.

5. A system for presenting color information corresponding to a display comprising a light modulating medium deformable by a charge pattern established by scanning with an electron beam, means providing a plurality of electrical color intelligence signals, one of said signals having a fixed parameter corresponding to one color component of said display, another of said signals having a variable parameter varying in accordance with the relative intensity of a plurality of other color components of said display, each of said signals having a second parameter varying in accordance with the intensity of the corresponding color component, means producing an electron beam and scanning it over a surface of said light modulating medium, and means controlling said beam by said electrical color intelligence signals to establish superimposed diffraction patterns on said medium with one of said patterns having a first parameter corresponding to said fixed parameter of said one of said signals and another of said diffraction patterns having a first parameter variable in accordance with the relative magnitude of said plurality of other color components, each of said patterns having a second parameter variable in accordance with the intensity of the corresponding color intelligence so that the resulting composite diffraction pattern contains the color component and intensity information of the display to be reproduced in point-by-point correspondence.

6. A system for presenting color information corresponding to a display comprising a light modulating medium deformable by a charge pattern established by scanning with an electron beam, means providing a plurality of electrical color intelligence signals, one of said signals having a fixed parameter corresponding to one color component of said display, another of said signals having a variable parameter varying in accordance with the relative intensity of a plurality of other color components of said display, each of said signals having a second parameter varying in accordance with the intensity of the corresponding color component, means producing an electron beam and scanning it over a surface of said light modulating medium, and means controlling said beam by said electrical color intelligence signals to establish superimposed phase diffraction patterns on said medium with one of said phase diffraction patterns having a wavelength corresponding to said one color component and another of said phase diffraction patterns having a wavelength variable in accordance with the relative magnitude of the other of said plurality of other color components, each of said patterns having an amplitude variable in accordance with the intensities of the corresponding color intelligence signal so that the resulting composite phase diffraction pattern contains the color component and intensity information of the display to be reproduced in point-by-point correspondence.

7. A system for producing a color image corresponding to a display comprising a light modulating medium deformable by a charge pattern established by scanning with an electron beam, means providing a plurality of electrical color intelligence signals, one of said signals having a fixed parameter corresponding to one color component of said display, another of said signals having a variable parameter varying in accordance with the relative intensity of a plurality of other color components of said display, each of said signals having a second parameter varying in accordance with the intensity of the corresponding color component, means producing an electron beam and scanning it over a surface of said light modulating medium, means controlling said beam by said electrical color intelligence signals to establish superimposed diffraction patterns on said medium with one of said patterns having a first parameter corresponding to said fixed parameter of said one of said signals and another of said diffraction patterns having a first parameter variable in accordance with the relative magnitude of said plurality of other color components, each of said patterns having a second parameter variable in accordance with the intensity of the corresponding color intelligence signals so that the resulting composite diffraction pattern contains the color component and intensity information of the display to be reproduced in point-by-point correspondence, a source of light for illuminating said medium with substantially parallel light rays and means including a light masking system for blocking zero order light diffraction patterns emanating from said medium and passing first order light diffraction patterns emanating from said medium to produce an image having point-by-point color and intensity correspondence with the display to be reproduced.

8. A system for producing a color image corresponding to a display comprising a light modulating medium deformable by a charge pattern established by scanning with an electron beam, means providing a plurality of electrical color intelligence signals, one of said signals having a fixed parameter corresponding to one color component of said display, another of said signals having a variable parameter varying in accordance with the relative intensity of a plurality of other color components of said display, each of said signals having a second parameter varying in accordance with the intensity of the corresponding color component, means producing an electron beam and scanning it over a surface of said light modulating medium, means controlling said beam by said electrical color intelligence signals to establish superimposed phase diffraction patterns on said medium with one of said phase diffraction patterns having a wavelength corresponding to said one color component and another of said phase diffraction patterns having a wavelength variable in accordance with the relative magnitude of the other of said plurality of other color components, each of said patterns having an amplitude variable in accordance with the intensities of the corresponding color intelligence signals so that the resulting composite phase diffraction pattern contains the color component and intensity information of the display to be reproduced in point-by-point correspondence, a source of light for illuminating said medium with substantially parallel light rays and means including a light masking system for blocking zero order light diffraction patterns emanating from said medium and passing first order light diffraction patterns emanating from said medium to produce an image having point-by-point color and intensity correspondence with the display to be reproduced.

9. A system for presenting color information corresponding to a display comprising a light modulating medium deformable by a charge pattern established by scanning with an electron beam, means providing three electrical color intelligence signals corresponding respectively to three different color components of the display, each of said signals having a fixed parameter corresponding respectively to different color components of said display and a second parameter varying in accordance with the intensity of the corresponding color component, means responsive to two of said electrical color intelligence signals for producing a resultant electrical color intelligence signal having a first parameter varying in accordance with the difference between the intensities of the two color components in said display corresponding to said two electrical color intelligence signals and a second parameter varying in accordance with the sum of the amplitudes of said two electrical color intelligence signals, means producing an electron beam and scanning it over a surface of said light modulating medium, and means controlling said beam by the remaining one of said electrical color intelligence signals and said resultant electrical color intelligence signal to establish superimposed diffraction patterns on said medium with one of said patterns having a first parameter corresponding to said fixed parameter of said remaining one of said signals and another of said diffraction patterns having a first parameter variable in accordance with said first parameter of said resultant electrical color intelligence signal, each of said patterns having a second parameter variable in accordance with the second parameter of said remaining and said resultant color intelligence signals so that the resulting composite diffraction pattern contains the color component and intensity information of the display to be reproduced in point-by-point correspondence.

10. A system for presenting color information corresponding to a display comprising a light modulating medium deformable by a charge pattern established by scanning with an electron beam, means providing three electrical color intelligence signals corresponding respectively to the red, blue and green components of the display, each of said signals having a fixed wavelength corresponding respectively to the red, blue and green color components and a variable amplitude varying respectively in accordance with the intensities of the red, blue and green color components of said display, means responsive to said electrical color intelligence signals corresponding to the blue and green color components of the display for producing a resultant electrical signal having a wavelength varying in accordance with the difference between the intensities of the blue and green components of said display and an amplitude varying in accordance with the sum of the intensities of said blue and green color components, and means controlling said beam by said electrical color intelligence signals to establish superimposed phase diffraction patterns on said medium with one of said phase diffraction patterns having a wavelength corresponding to said red color component and another of said phase diffraction patterns having a wavelength variable in accordance with the relative intensity of the blue and green color components, one of said patterns having an amplitude variable in accordance with the intensity of the red color intelligence signal and the other of said patterns having an amplitude varying in accordance with the sum of said blue and green color components so that the resulting composite phase diffraction pattern contains the color component and intensity information of the display to be reproduced in point-by-point correspondence.

11. A system for presenting color information corresponding to a display comprising a light modulating medium which may be modified by scanning with an electron beam comprising means providing a plurality of electrical color intelligence signals corresponding to different color components of a display, means combining said signals to produce a single electrical signal having one parameter varying in accordance with the ratio of the intensities of two of said components and a second parameter which varies in accordance with the sum of the intensities of two of said components, means producing an electron beam and scanning it over a surface of said light modulating medium and means controlling said beam by said single electrical color intelligence signal to establish a diffraction pattern on said medium having two parameters which vary respectively in accordance with the ratio of the intensities of said two color components and an amplitude which varies in accordance with the sum of the intensities of said two color components in point-by-point positional correspondence with the display.

12. A system for presenting color information corresponding to a display comprising a light modulating medium which may be modified by scanning with an electron beam comprising means providing a plurality of electrical color intelligence signals corresponding to different color components of a display, means combining said signals to produce a single electrical signal having a frequency varying in accordance with the ratio of the intensities of two of said components and a magnitude which varies in accordance with the sum of the intensities of two of said components, means producing an electron beam and scanning it over a surface of said light modulating medium and means controlling said beam by said single electrical color intelligence signal to establish a phase diffraction pattern on said medium having a wavelength which varies in accordance with the ratio of the intensities of said two color components and an amplitude which varies in accordance with the sum of the intensities of said two color components.

References Cited in the file of this patent

UNITED STATES PATENTS 2,813,146 Glenn ---------------- Nov. 12, 1957